United States Patent

Rhoda et al.

[11] Patent Number: 5,486,095
[45] Date of Patent: Jan. 23, 1996

[54] SPLIT DISK BLADE SUPPORT

[75] Inventors: James E. Rhoda, Mason; Thomas A. Bradley, Milford; Mark J. Mielke, Blanchester, all of Ohio

[73] Assignee: General Electric Company, Cincinnati, Ohio

[21] Appl. No.: 351,997

[22] Filed: Dec. 8, 1994

[51] Int. Cl.$^6$ ................................................ F01D 5/14
[52] U.S. Cl. ................................ 416/214 A; 416/220 R; 416/219 R
[58] Field of Search ........................ 416/214 A, 219 R, 416/220 R, 217, 218

[56] References Cited

U.S. PATENT DOCUMENTS

| | | | |
|---|---|---|---|
| 2,751,189 | 6/1956 | Ledwith | 416/217 |
| 3,137,478 | 6/1964 | Farrell | 416/220 R |
| 4,094,615 | 6/1978 | Glenn | 416/220 R |
| 4,502,841 | 3/1985 | Kebedjis | 416/220 R |
| 4,521,160 | 6/1985 | Bouiller et al. | 416/218 |
| 5,007,800 | 4/1991 | Hacault et al. | 416/220 |
| 5,022,822 | 6/1991 | Sincere | 416/219 |
| 5,112,193 | 5/1992 | Greer et al. | 416/220 R |
| 5,131,814 | 6/1992 | Przytulski et al. | 416/217 |
| 5,135,354 | 8/1992 | Novotny | 416/214 A |
| 5,213,475 | 5/1993 | Peterson et al. | 416/219 R |
| 5,310,317 | 5/1994 | Bailey et al. | 416/215 |

FOREIGN PATENT DOCUMENTS 2097480  11/1981  United Kingdom .................... 416/219

OTHER PUBLICATIONS

Garrett Engine Division, "Cast–Hollow Fan Blade Technology," USAF Report WL–TR–91–2006, Dec. 1990, pp.: Cover, Title, iii, V, I, 25, 27, 28, and 29.

Primary Examiner—Edward K. Look
Assistant Examiner—Mark Sgantzos
Attorney, Agent, or Firm—Andrew C. Hess; Patrick R. Scanlon

[57] ABSTRACT

A blade support includes first and second abutting disks, with the first disk having a plurality of axial dovetail slots at one end thereof, and a circumferential dovetail first half-slot at an opposite end thereof, with the second disk having a circumferential dovetail second half-slot therein. A plurality of rotor blades have axial dovetails disposed in respective ones of the axial dovetail slots, and circumferential dovetails disposed in part in each of the first and second half-slots. The first and second disks are retained together so that the first and second half-slots collectively support the circumferential dovetails.

9 Claims, 2 Drawing Sheets

5,486,095

SPLIT DISK BLADE SUPPORT

The present invention relates generally to gas turbine engines, and, more specifically, to rotor blade support arrangements.

BACKGROUND OF THE INVENTION

Aircraft gas turbine engines include fan, compressor, and turbine rotor blades which are typically removably mounted to supporting rotor disks. The rotor blades include various circumferential or axial dovetails which are supported in complementary circumferential or axial dovetail slots formed in the rotor disks. Axial dovetails are readily assembled to their respective rotor disks by merely axially sliding the dovetail into the rotor disk, with disassembly thereof being prevented by conventional forward and aft blade retainers.

In order to install circumferential dovetails, a loading slot is required so that the dovetails may be initially radially inserted into the loading slot and then slid circumferentially into position into the dovetail slot. Since the loading slot is not capable of providing any radial retention force, the circumferential dovetails are typically sized for having circumferential spacing therebetween which is typically on the order of the circumferential extent of the loading slot itself. Upon insertion of the last circumferential dovetail into the loading slot, all the blades are circumferentially indexed so that no circumferential dovetail is positioned at the loading slot, with adjacent circumferential dovetails straddling the loading slot for ensuring the radial retention thereof and effective transfer of centrifugal forces from the blades to the disk during operation.

In one type of engine design, fan blades may have a low radius ratio, which is the ratio between the inner diameter to the outer diameter of the flowpath typically measured at the blade platform and tip, that results in a relatively small perimeter of the supporting disk. This increases the difficulty of carrying centrifugal loads from the blades and into the disk with acceptably low stress. Low radius ratio blades are therefore typically formed integrally with the rotor disk, from a common forging for example, for ensuring relatively low stresses during operation and a suitable useful life thereof. However, individual blades are therefore not readily removable since cutting thereof would be required.

It is desirable to have individually removable rotor blades in a low radius ratio blade configuration with acceptable retention stresses therein during operation.

SUMMARY OF THE INVENTION

A blade support includes first and second abutting disks, with the first disk having a plurality of axial dovetail slots at one end thereof, and a circumferential dovetail first half-slot at an opposite end thereof, with the second disk having a circumferential dovetail second half-slot therein. A plurality of rotor blades have axial dovetails disposed in respective ones of the axial dovetail slots, and circumferential dovetails disposed in part in each of the first and second half-slots. The first and second disks are retained together so that the first and second half-slots collectively support the circumferential dovetails.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
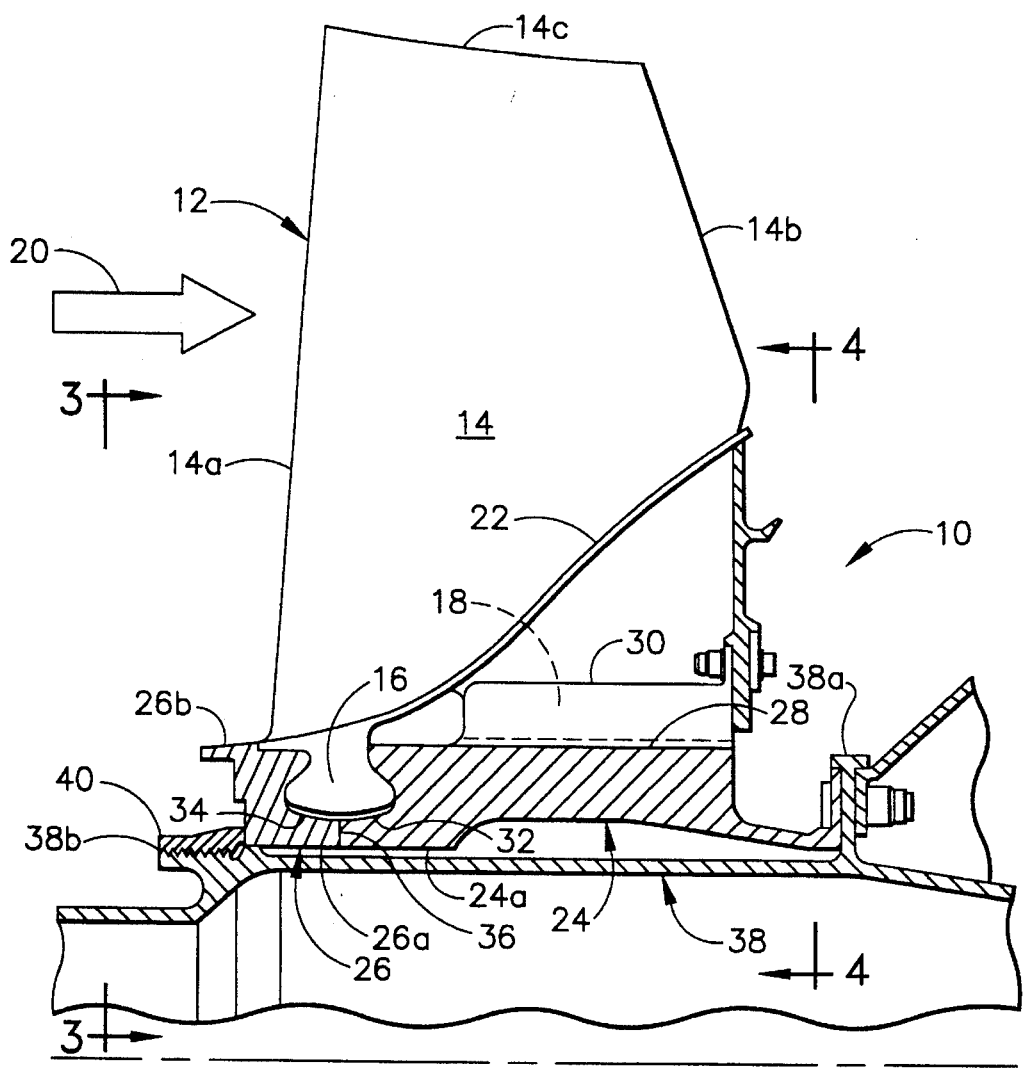
FIG. 1 is an axial, partly sectional view of a rotor assembly including a plurality of rotor blades in first and second abutting disks.
Figure 2:
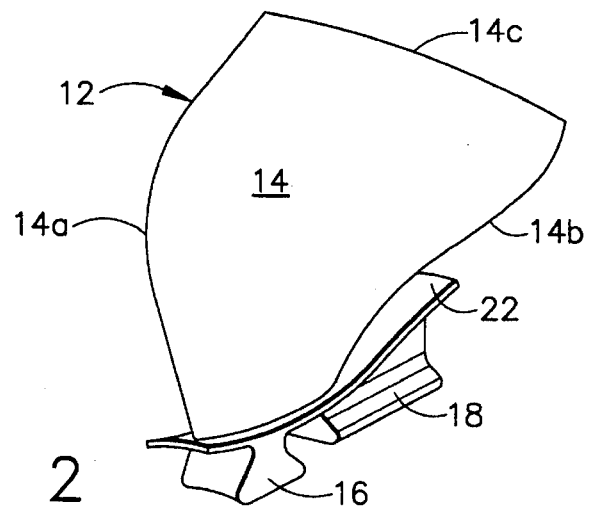
FIG. 2 is a perspective view of an exemplary one of the rotor blades illustrated in FIG. 1 showing circumferential and axial dovetails joined to an airfoil thereof.

Illustrated in FIG. 1 is a portion of an exemplary fan rotor assembly 10 configured for supporting individually removable low radius ratio fan rotor blades 12 therein. An exemplary one of the rotor blades 12 is also illustrated in FIG. 2 and includes an airfoil 14 and axially spaced apart circumferential and axial dovetails 16, 18 integrally joined thereto. The airfoil 14 has leading and trailing edges 14a,b over which ambient air 20 flows downstream therebetween during operation, with the airfoil 14 also having a radially outer tip 14c. Each blade 12 also includes an integral platform 22 disposed integrally between the airfoil 14 and the axial and circumferential dovetails 16, 18 for providing an inner flow boundary for the air 20 during operation.

In the exemplary embodiment illustrated in FIG. 1, the blade 12 has a relatively low radius ratio as well as a relatively low aspect ratio, which is the ratio of the airfoil span length to its chord length typically identified at the mid-span or pitchline thereof, which results in the platform 22 having a relatively large slope radially outwardly from the leading edge 14a to the trailing edge 14b of the airfoil 14. Radius ratio and aspect ratio are conventional terms with low values thereof being conventionally associated with a relatively small outer diameter of the rotor disk by which the centrifugal forces generated by the blade 12 during operation may be carried.

Typical low radius ratio airfoils are integrally formed with a supporting disk in a one-piece rotor known conventionally as a blisk. However, such airfoils are not readily removable therefrom without cutting thereof, and it is desirable to have individually removable blades in a low radius ratio arrangement. This is accomplished in accordance with the present invention by providing both dovetails 16, 18 in a compact and efficient supporting arrangement with annular first and second rotor disks 24, 26 as illustrated in FIG. 1.

Figure 3:
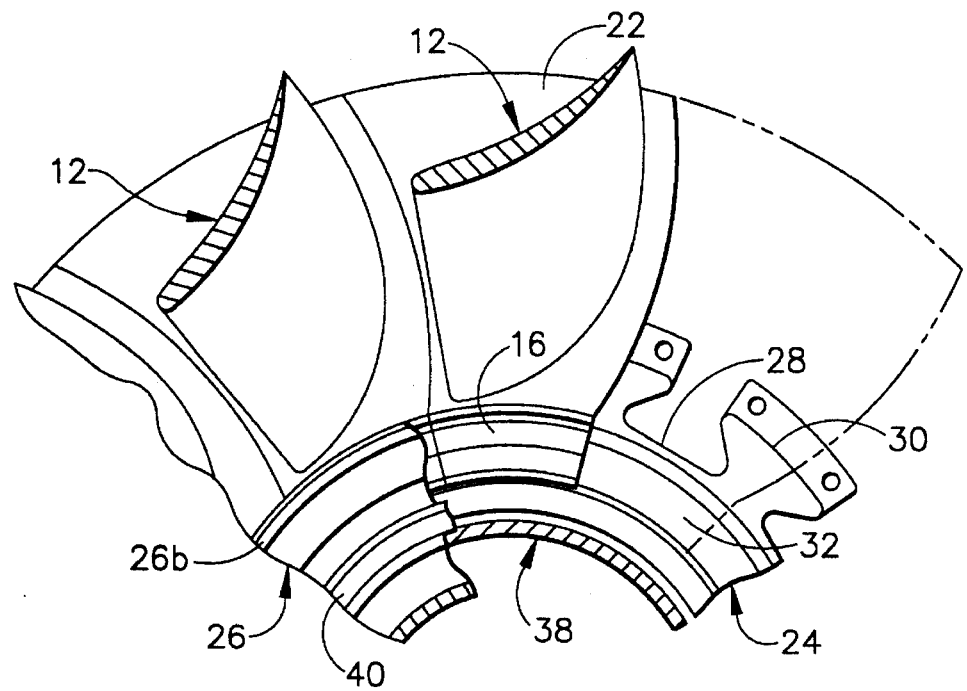
FIG. 3 is a partly sectional, aft facing view of a portion of the rotor assembly illustrated in FIG. 1 and taken generally along line 3—3.
Figure 4:
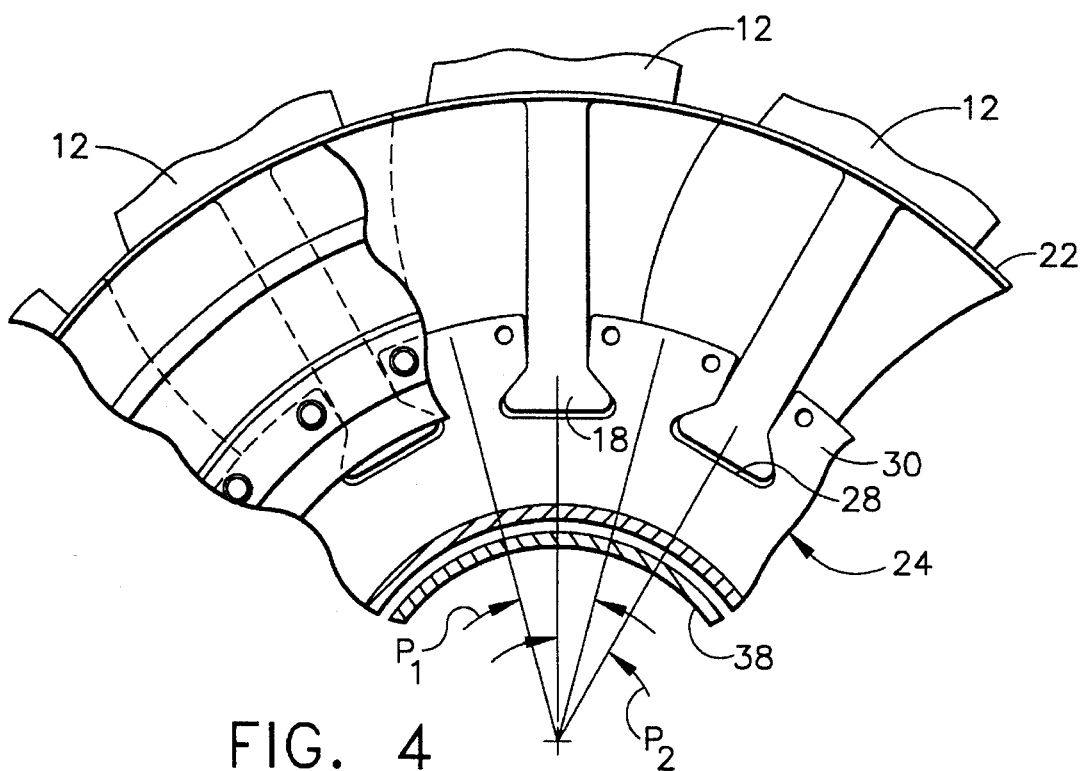
FIG. 4 is a partly sectional, forward facing view of a portion of the rotor assembly illustrated in FIG. 1 and taken generally along line 4—4.

In the exemplary embodiment of the invention illustrated in FIGS. 1 and 2, the circumferential dovetail 16 is preferably disposed upstream of or forward of the axial dovetail 18 adjacent to the leading edge 14a, with the axial dovetail 18 being disposed adjacent to the trailing edge 14b. Correspondingly, the first disk 24 illustrated in. FIGS. 1, 3, and 4 includes a plurality of circumferentially spaced apart, axial dovetail slots 28 around the perimeter thereof which are defined by circumferentially adjacent axial dovetail posts 30 at an aft end of the first disk 24. The first disk 24 has an axial centerline axis, with the axial dovetail slots 28 extending generally parallel thereto. The axial dovetail 18, complementary axial dovetail slots 28, and the axial dovetail posts 30 may take any conventional form such as that illustrated in the Figures, with the axial dovetail 18 being symmetrical with two opposing lobes or tangs for example.

As shown in FIGS. 1 and 3, the first disk 24 also includes a circumferential dovetail first half-slot 32 in an opposite or forward end thereof which is continuous around the circumference of the first disk 24. The second disk 26 as illustrated in FIG. 1 has a complementary circumferential dovetail second half-slot 34 at its aft end, with the second disk 26 and half-slot 34 also being continuous around the circumference thereof.

Each of the fan blades 12 illustrated in FIG. 1 may be initially installed in the first disk 24 by axially sliding the respective axial dovetail 18 in a respective one of the axial dovetail slots 28. The posts 30 radially support the fan blades 12 therein in restraint against centrifugal force during operation. The corresponding circumferential dovetail 16 of each blade 12 is firstly disposed in part in the first half-slot 32 in abutment therewith which prevents further axially rearward movement of the axial dovetail 18. In this way all of the plurality of fan blades 12 may be firstly installed in their respective axial dovetail slots 28. The second disk 26 is then disposed in abutting contact with all of the blade circumferential dovetails 16, with the second half-slot 34 receiving the remaining parts of the circumferential dovetails 16.

The first and second disks 24, 26 abut together at a circumferentially extending splitline 36 which is preferably disposed symmetrically and radially below the blade circumferential dovetails 16, with the first and second half-slots 32, 34 collectively defining a complete circumferential dovetail slot for supporting the blade circumferential dovetails 16 therein. The individual circumferential dovetails 16 and the complementary dovetail slot 32, 34 may take any conventional form such as that illustrated in FIG. 1 including symmetrically opposite lobes or tangs, with the splitline 36 being centered therebetween. The splitline 36 may have alternate configurations including a rabbet.

Both the first and second disks 24, 26 at the circumferential dovetail slot 32, 34 are circumferentially continuous for providing hoop stress load carrying capability. In this way, the circumferential dovetails 16 are retained not only by radial shear force in the corresponding posts defining the half-slots 32, 34, but also by the circumferential hoop load carrying capability of the mating half-slots 32, 34. Since no loading slot is required in the first and second disks 24, 26 for radially inserting the individual circumferential dovetails 16, the load path interruption created thereby is avoided. Furthermore, by removing the entire second disk 26, any one of the individual fan blades 12 may be removed and replaced as desired which is not possible in a conventional circumferential dovetail arrangement having a single loading slot. In that case all blades between the loading slot and the desired blade must be removed in order to reach it.

In the exemplary configuration illustrated in FIG. 1, the platforms 22 of the blades 12 slope substantially outwardly in a downstream direction. By positioning the circumferential dovetails 16 upstream of the axial dovetails 18, a compact and efficient load carrying arrangement is created. Since the diameter of the platform 22 at the circumferential dovetails 16 is substantially less than the diameter of the platform 22 at the axial dovetails 18, the circumferential dovetails 16 and supporting dovetail half-slots 32, 34 provide a maximum amount of circumferential load retaining structure in a relatively small area without interruption. Although the axial placement of the circumferential and axial dovetails 16, 18 could be reversed in other embodiments if desired, the resulting arrangement would not enjoy this benefit.

Referring again to FIG. 1, each of the first and second disks 24, 26 has a respective coextensive, central bore 24a, 26a through which a low pressure rotor shaft 38 extends axially. The shaft 38 includes an annular retaining flange 38a disposed at an aft end thereof in abutting, retaining contact with an aft end of the first disk 24, and also includes conventional screw threads 38b at an opposite, forward end thereof disposed adjacent to the forward end of the second disk 26. A conventional spanner nut 40 is threadingly joined to the shaft threads 38b for axially compressing together the first and second disks 24, 26 at the splitline 36, and between the nut 40 and the retaining flange 38a.

As shown in FIG. 1, the second disk 26 is relatively compact in section for efficiently carrying centrifugal loads from the circumferential dovetails 16, and the forward end of the first disk 24 is similarly compact and extends axially coextensively with the second disk 26. Furthermore, the axial dovetail slots 28 are disposed at an elevation radially above the first half-slot 32, with the blade axial dovetails 18 being correspondingly disposed at an elevation radially above the blade circumferential dovetails 16. In this way, the first disk 24 is solid below the axial dovetail slots 28 and axially aft of the first half-slot 32 for effectively carrying centrifugal loads from both the circumferential and axial dovetails 16, 18 at suitably low stress levels.

As shown in FIG. 3, each of the circumferential dovetails 16 preferably extends the full circumferential width of the blade platform 22, with the circumferential dovetails 16 circumferential abutting each other completely around the circumferential dovetail slot 32, 34. In this way, the entire circumferential extent of the first and second half-slots 32, 34 may be fully utilized for carrying the centrifugal loads from the blades 12 which can not be done in a conventional loading slot configuration.

As shown in FIG. 4, the axial dovetail posts 30 have a circumferential pitch $P_1$ measured center-to-center which is preferably equal to the circumferential pitch $P_2$ of adjacent ones of the axial dovetails 18 and their slots 28 measured center-to-center. In this exemplary embodiment, there are eighteen fan blades 12 with the respective pitches $P_1$, $P_2$ being each 20°.

As shown in FIGS. 1 and 3, the second disk 26, further includes an integral annular band 26b around the perimeter thereof, with the band 26b being coextensive with the upstream ends of the blade platform 22 for providing an aerodynamically smooth transition therewith.

Accordingly, the fan rotor assembly 10 described above allows for individually replaceable fan blades 12 in a low radius ratio application while effectively carrying centrifugal loads from the blades 12 through the respective dovetails 16, 18 into the clamped together first and second disks 24, 26. The circumferential dovetail slot defined by the half-slots 32, 34 extends a full 360° which provides hoop load carrying capability not found in conventional circumferential dovetail arrangements.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A blade support comprising:

a first disk having a plurality of circumferentially spaced apart, axial dovetail slots at one end thereof, and a circumferential dovetail first half-slot at an opposite end thereof;

a plurality of rotor blades each having an airfoil and axially spaced apart circumferential and axial dovetails integrally joined thereto, said axial dovetail being disposed in a respective one of said axial dovetail slots in said first disk, and said circumferential dovetail being disposed in part in said first half-slot of said first disk;

a second disk having a circumferential dovetail second half-slot at one end thereof disposed in abutting contact with said blade circumferential dovetails and said first disk for receiving a remaining part of said circumferential dovetails, with said first and second half-slots collectively defining a complete circumferential dovetail slot for supporting said blade circumferential dovetails therein; and means for retaining together said first and second disks.

2. A blade support according to claim 1 wherein said first and second disks abut together at a circumferentially extending splitline disposed radially below said blade circumferential dovetails.

3. A blade support according to claim 2 wherein:

said first and second disks have respective coextensive bores; and said retaining means comprise:

a rotor shaft extending through said first and second disk bores, with an annular retaining flange disposed at one end thereof for retaining said first disk, and threads at an opposite end of said shaft adjacent to said second disk; and a spanner nut threadingly joined to said shaft threads for axially compressing together said first and second disks at said splitline and between said nut and said retaining flange.

4. A blade support according to claim 3 wherein said first and second disks at said circumferential dovetail slot are circumferentially continuous for providing hoop load carrying capability.

5. A blade support according to claim 3 wherein:

said blade axial dovetails are disposed at an elevation radially above said blade circumferential dovetails; and said axial dovetail slots are disposed at an elevation radially above said first half-slot.

6. A blade support according to claim 3 wherein each of said blades further includes:

leading and trailing edges; and a platform disposed between said airfoil and said axial and circumferential dovetails for providing an inner flow boundary, and said platform slopes radially outwardly from said leading edge to said trailing edge; and wherein said circumferential dovetail is disposed upstream of said axial dovetail adjacent to said leading edge, with said axial dovetail being disposed adjacent to said trailing edge.

7. A blade support according to claim 6 wherein said second disk further includes an annular band around a perimeter thereof, said band being coextensive with said blade platforms for providing an aerodynamically smooth transition therewith.

8. A blade support according to claim 6 wherein said blade circumferential dovetail extends the full width of said blade platform.

9. A blade support according to claim 6 wherein said blade circumferential dovetails circumferentially abut each other completely around said circumferential slot.

* * * * *